April 21, 1959

W. J. SALOGA
STONE BREAKER 2,882,888

Filed April 29, 1957

INVENTOR.
Walter J. Saloga
BY
Loyd J. Miller
ATTORNEY

April 21, 1959     W. J. SALOGA     2,882,888
STONE BREAKER

Filed April 29, 1957     5 Sheets-Sheet 4

INVENTOR.
Walter J. Saloga
BY Loya J. Miller
ATTORNEY

April 21, 1959

W. J. SALOGA
STONE BREAKER 2,882,888

Filed April 29, 1957

INVENTOR.
Walter J. Saloga,
BY Loyal J. Miller
ATTORNEY

United States Patent Office 2,882,888
Patented Apr. 21, 1959

2,882,888

STONE BREAKER

Walter J. Saloga, Oklahoma City, Okla.

Application April 29, 1957, Serial No. 655,831

2 Claims. (Cl. 125—23)

The present invention relates to stone cutting and has reference more particularly to an improved machine adapted to cut or break building stone or blocks along a predetermined line of fracture.

Stratified stone, commonly used in the construction of walls for buildings, fireplaces etc., is often, when it is removed from the quarry, of irregular shape thus requiring the same to be cut or broken to "square" the ends and sides thereof. Furthermore large slabs of stone received from the quarry must be broken or cut into smaller sections or pieces so that they may be more easily handled and for providing a more pleasing pattern or appearance of the wall or the like.

Experience has proven that such breaking or cutting of such stone may be more easily accomplished by means of a stone cutting machine which in general comprises a rigid frame which has associated a pair of cutting edges, one of which is movable toward and away from the other cutting edge. Some power means is used for actuating the movable cutting edge. The prior art reveals a number of such machines but most of these devices have the common failure of not being constructed in a manner which will permit biasing movement of the moving cutting means relative to the other cutting means and with relation to the supporting frame and the power means. This frequently results in extensive damage being done to the machine and limits the versatility of the device in breaking irregular shaped stone.

It is therefore the principal object of this invention to provide a stone breaking machine which may be employed for breaking stone of irregular shapes and sizes to form relatively long narrow strips or relatively small rectangular sections of stone.

A similarly important object is to provide a stone breaking machine having at least one movable cutting edge which is mounted for biasing movement relative to the supporting frame of the device.

Another object is to provide a device of this class which may be easily operated by a single workman.

Another object is to provide a stone breaking machine which includes an upper and a lower row of cutting teeth or chisels each row of which is arranged for individual vertical movement relative to their support for adjustably positioning the teeth adjacent the irregular surface of a stone to be cut, and thereby impart a uniform pressure by the cutting edges of the teeth along a predetermined line of fracture for avoiding rupture of the stone at irregular points or zones adjacent the desired breaking line.

A further object of this invention is to provide a stone breaking machine having a movable delivery ramp adjacent one side of the machine associated with a movable stop element or gauge for regulating the width of stone to be cut and in which both the ramp and gauger are retractible simultaneously from contact with the under surface and edge of the stone when the same is gripped between the cutting means.

An additional object is to provide a stone cutting machine of this class having a pair of vertically aligned cutting edges each of which comprise a plurality of teeth or chisels which are actuated by hydraulic and spring means for movement toward and away from the surface of the stone to be cut, thus resiliently positioning the cutting surface of each respective tooth in contact with the surface of the stone upon actuation of the hydraulic means.

Yet another object is to provide a stone breaking machine of rigid compact construction which will easily withstand the rough treatment with which an apparatus of this class is ordinarily subjected to without any resulting amount of appreciable damage being done to the framework of the moving component parts thereof.

Still another object is to provide a stone breaker of this class having hydraulic means for actuating the mechanism thereof which is operatingly controlled by only one compound hydraulic valve, thereby eliminating extensive hydraulic supply lines.

A still further object is to provide a stone breaking machine of this class which is mounted on a pair of wheels and is adapted to be towed in a trailer-like manner from one location to another.

The present invention accomplishes these and other objects by providing a horizontally disposed base frame mounted on a pair of wheels. The frame further includes a pair of rigid upright posts having stationary upper and lower cross members rigidly connected to the respective upper and lower ends of the posts. An intermediate or third cross member is slidably carried by the posts for vertical movement between the upper and lower cross members. Vertically aligned cutting means is carried by the upper surface of the lower cross member and the lower surface of the movable cross member. Power means carried by the upper cross member and resiliently connected to the movable cross member actuates the latter for movement thereof in cutting or breaking a stone between the cutting means. The cutting means each comprises a plurality of individual chisels or teeth arranged in side-by-side relationship longitudinally of the respective cross member. Each individual tooth is vertically adjustable with relation to the supporting cross member and includes means for securely positioning the teeth in contact with the irregularities of the surface of a stone to be cut. Pump means supplies a cleaning fluid or wash to the lower cutting means. Side delivery ramp means including a stop element is retracted from contact with the under surface and one side of the stone to be cut when the same is positioned between the cutting means.

Other objects will be apparent from the following description when taken in conjunction with the accompanying five sheets of drawings, wherein.

Like characters of reference designate like parts in those figures of the drawings in which they occur.

In the drawings.

Figure 1:
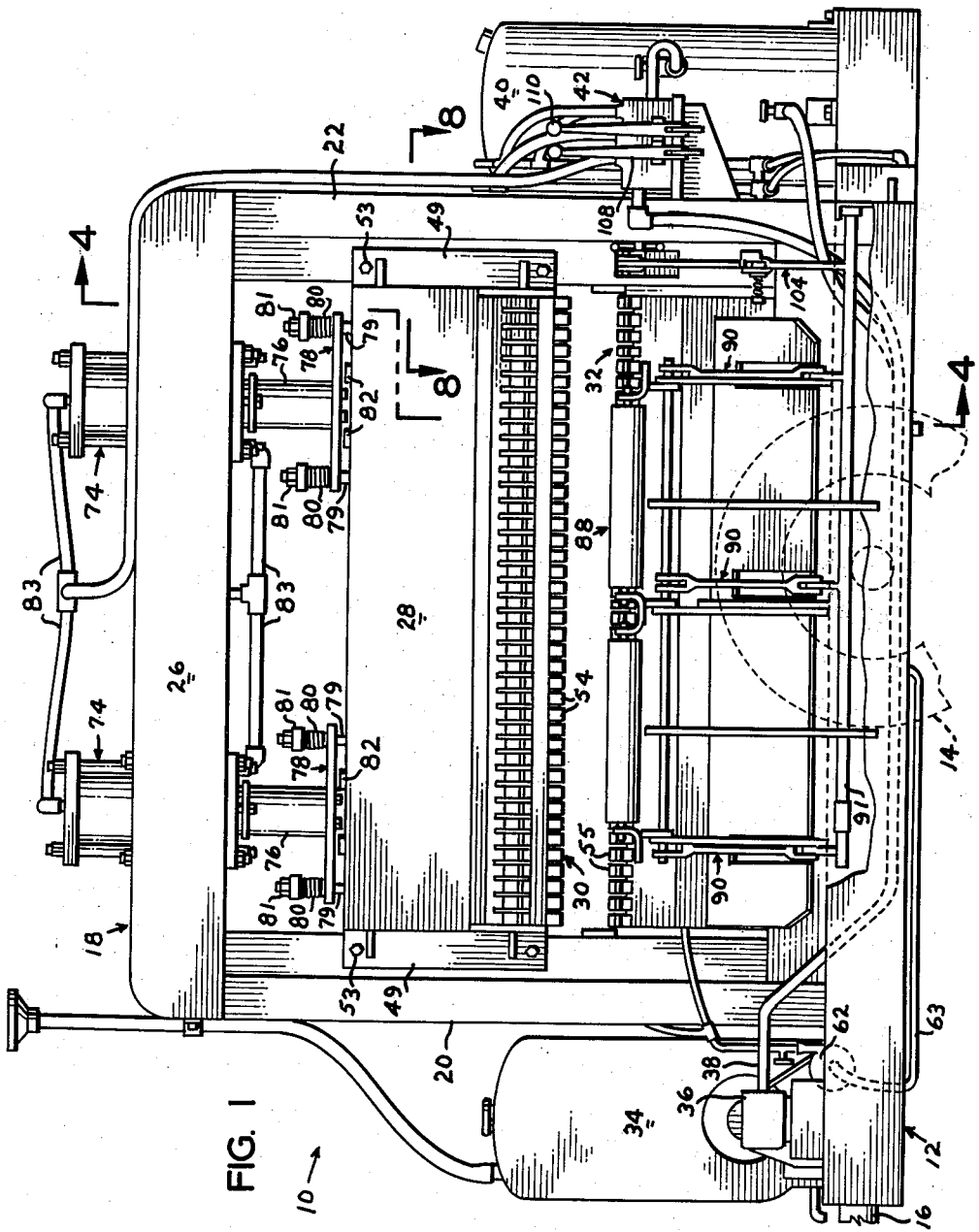
Figure 1 is a left side elevational view of the machine.
Figure 2:
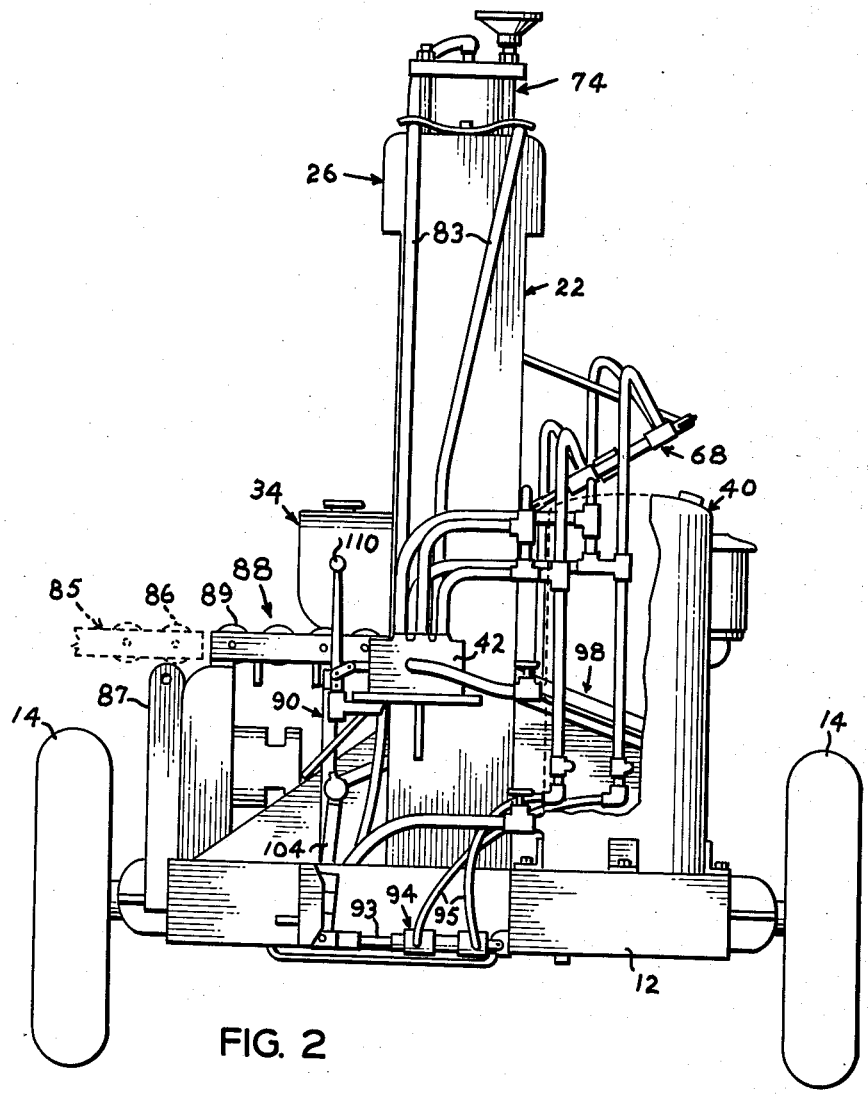
Figure 2 is a rear end elevational view of the machine.
Figure 3:
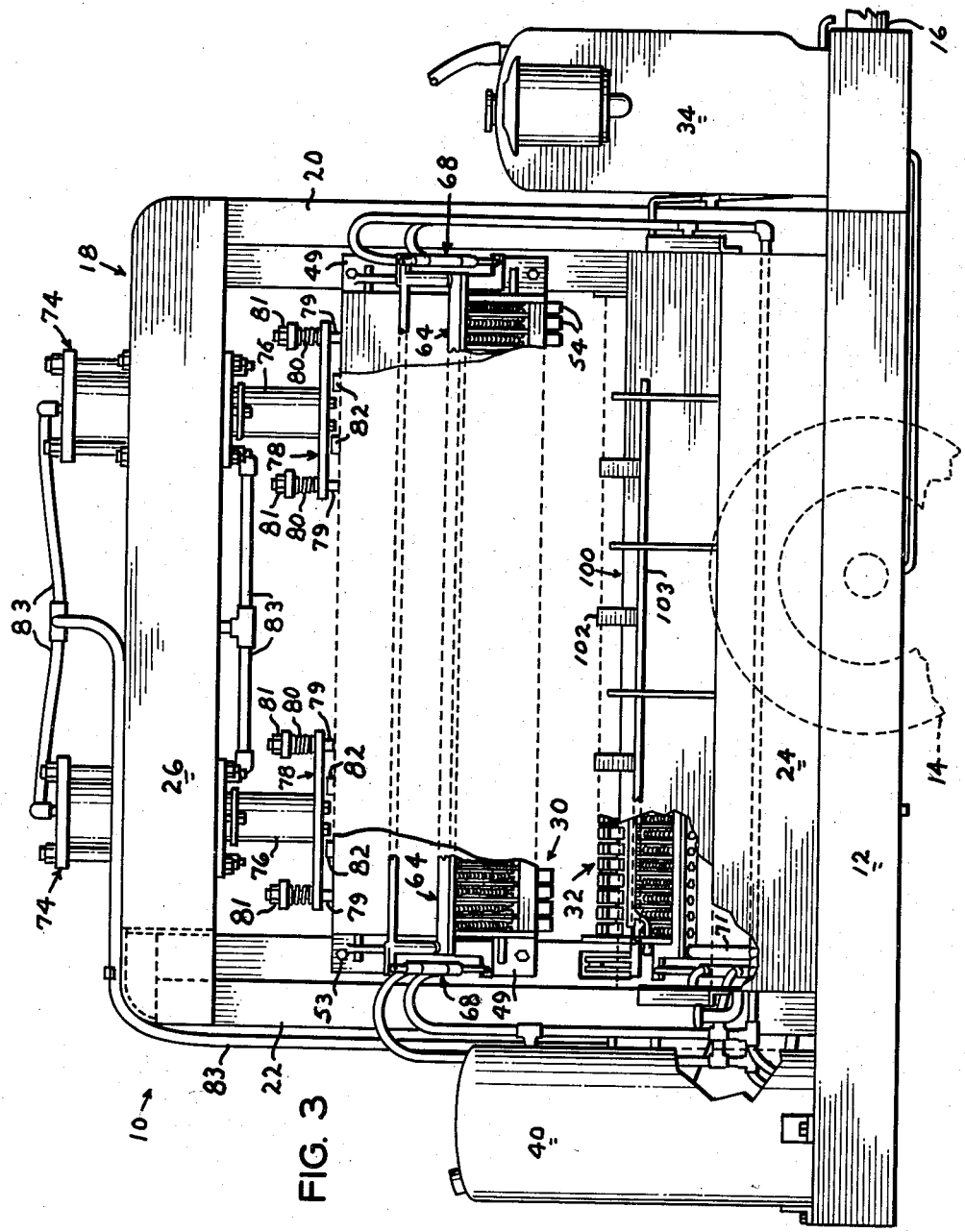
Figure 3 is a right side elevational view of the machine.

The reference numeral 10 indicates the machine, as a whole, comprising a substantially rectangular horizontally disposed base frame 12 having a pair of supporting wheels 14 mounted on opposite sides thereof, whereby the machine may be towed in a trailer-like manner behind suitable power means, not shown, by means of a tongue or trailer hitch, a portion of which is shown at 16. The numeral 18 indicates, as a whole, an upright frame comprising a pair of vertically disposed posts 20 and 22 rigidly joined at their lowermost ends to the upper surface of the ends of the base frame 12 and a lower stationary cross member 24 (Fig. 4) which extends between and is rigidly connected to the lower end portion of the posts 20 and 22. The upright frame 18 further includes an upper or top cross member 26 which extends between and is rigidly connected to the upper end portions of the posts 20 and 22. A third or intermediate movable cross member 28 extends horizontally between and is slidably carried by the end posts 20 and 22, in a manner more fully disclosed hereinbelow. A cutting means 30 is carried in depending relation by the lower longitudinal surface of the intermediate cross member 28 for co-operating with a cutting means 32 longitudinally carried by the upper surface of the lower cross member 24. Thus, the intermediate cross member 28 and cutting means 30 comprises an upper jaw, and the lower cross member 24 and its cutting means 32 comprises a lower jaw of the machine.

The machine 10 further includes an engine or motor 34 carried by one end of the base frame 12 which is drivably connected to a hydraulic fluid pump 36 connected by conduits 38 to a hydraulic fluid reservoir 40 carried by the base frame 12 at its end opposite the engine 34. A conventional multi-valved bi-lever controlled hydraulic valve 42, carried by the post 22, is employed to actuate the movable cross member in a manner more fully disclosed hereinbelow.

Figures 4, 8:
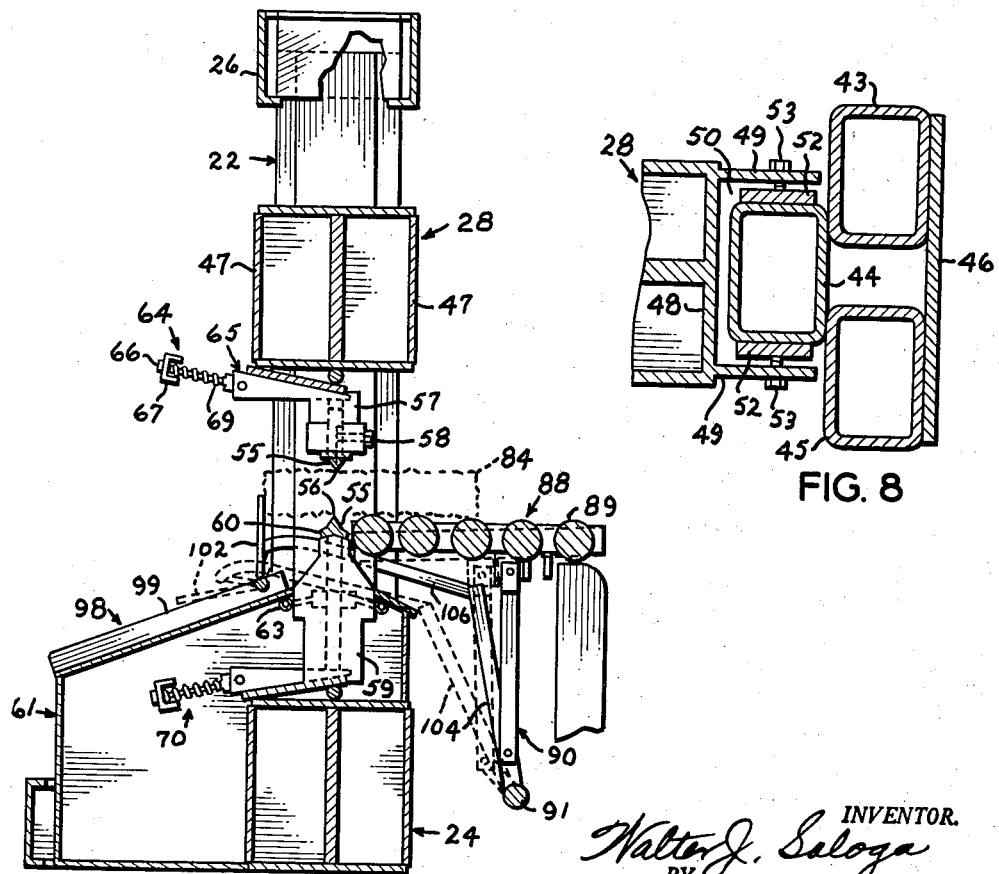
Figure 4 is a vertical cross sectional view, partly in elevation, taken substantially along line 4—4 of Fig. 1.
Figure 8 is a fragmentary horizontal cross sectional view taken substantially along line 8—8 of Fig. 1.

Referring more particularly to Fig. 8 it may be seen that the post 22 comprises three hollow columns 43, 44 and 45 which are rigidly connected together to form a substantially T-shaped post as viewed in horizontal cross section. The column 44 comprises the shank of the T-shape while a plate 46 rigidly joining the columns 43 and 45 completes the top portion of the T-shape. The post 20 is similarly formed and thus comprises a pair of T-shaped support and guiding posts which are rugged in construction and when connected by the upper channel-like cross member 26, will not twist or become misaligned when subjected to the heavy stress and strains to which the machine is ordinarily subjected during stone cutting operations. The columns 44, comprising the shank portion of the T-shaped posts, are disposed inwardly of the upright frame 18 in co-operating relation for the purpose of providing vertical surfaces or guiding means for the intermediate cross member 28. As seen in Fig. 4, the cross member 28 substantially comprises an H-beam having the central web thereof vertically disposed. The normally open sides of the beam are closed by rigidly connected plates 47 and is similarly closed adjacent each end by end plates 48 (Fig. 8), thus forming a closed box-like intermediate cross member. The opposing ends of the intermediate cross member 28 are each provided with a pair of rigidly connected plates 47 extending longitudinally outward in spaced-apart parallel relation from the respective ends of the member, forming a three sided socket 50 for loosely receiving the respective shank portion of each T-shaped post. As is shown in Fig. 8, the length of the intermediate cross member 28, not including the plates 49, is less than the spacing between the inwardly disposed vertical surfaces of the shank portions of the posts 20 and 22, for the purposes which will presently be apparent. The ends or socket portions 50 of the member 28 are held in guiding contact with the adjacent sides of the shanks of the posts by a pair of guide plates 52 carried inwardly of the plates 49 by bolts 53, so that the cross member 28 may be adjusted transversely of the posts 20 and 22 for maintaining the cutting means 30 of the intermediate cross member properly aligned with the cutting means 32 of the lower cross member for a stone cutting operation, as more fully explained hereinbelow. If desired, the bolts 53 may be provided with locking means such as lock nuts, not shown, for preventing accidental loosening or tightening of the guide plates 52.

I prefer to construct and arrange the cutting means 30 and 32 in a manner broadly similar to the arrangement shown by the prior art, for example the Entz Patent 2,762,359, in that the cutting means 30 and 32 includes a plurality of independently movable chisels 54 and 55, respectively, each chisel having a cutting edge 56 extending longitudinally of their associated supporting cross members 24 and 28, respectively.

As seen in Fig. 4, a vertically slotted chisel bar guide 57 is rigidly connected in depending relation to the lower surface of the cross member 28 which serves as a means for vertical movement of the chisels 54. Each of the chisels 54 are limited in their downward movement and prevented from falling out of contact with the guide bar 57 by providing each chisel with a groove or slot in one face into which bolts 58 carried by the guide bar 57 extends. Thus, the chisels 54 are limited in their upward movement when contacting the upper surface of a stone to be cut by the structure of the cross member 28 and are limited in their downward movement against gravitational attraction by the upper end of the slot in each chisel contacting the inwardly disposed end of the respective bolt 58. I prefer to arrange the chisels 54 in close spaced-apart relation rather than in sliding contact as shown by the prior art for providing more freedom of movement of the individual chisels by allowing space for accumulation of dust or stone chips which tend to bind the chisels when placed in sliding contact.

Similarly, the chisels 55 of the lower cutting means 32 are supported for vertical movement above the lower cross member 24, by a vertically slotted guide bar 59 longitudinally secured to the upper surface of the member 24. Gravitational attraction holds the chisels 55 in a normally downwardly disposed position. The chisels 55 are similarly arranged in close spaced-apart co-operating relation below the chisels 54 so that the upper and lower chisels co-act in effecting a clean cut when cutting a stone, and thus prevents chipping or breaking the stone in an uneven manner. Each of the chisels 55 are provided with eave-like projections 60 extending laterally of the chisel cutting edge 56 and transversely of the cross member 24 for the purpose of preventing dust particles and stone chips impeding the movement of the chisels in their respective slots. Even with this provision of eave-like deflecting surfaces 60 some stone dust accumulates and tends to hamper the movement of the chisels 55. In order to overcome this unwanted and chisel hampering dust, I provide a sump or wash tank 61 partially filled with a suitable wash fluid for bathing the shank portions of the chisels 55 and carrying away the dust particles. A motor driven pump 62 connected by conduits 63 circulates the wash fluid and directs a spray of the wash fluid or lubricant against the shanks of the chisels 55. Unwanted dust residue tends to settle to the bottom of the tank 61 from which it may be cleaned periodically.

A chisel setting wedge mechanism 64 is provided for positioning each of the chisels 54 individually. The mechanism 64 includes a plurality of wedges 65 arranged, transversely of the cutting means as shown in Fig. 4, with the tapered end portion of each respective wedge disposed between the upper end of the respective chisel 54 and the structure of the cross member 28. The outwardly disposed end of each wedge 65 is provided with a pivotally connected rod-like extension 66 which projects laterally outward through co-operating openings in channel-like wedge bar 67. The wedge bar 67 is arranged parallel with the cross member 28 and is actuated for movement toward and away from the adjacent side of the cross member 28 by a hydraulic cylinder 68 carried by the cross member at each respective end thereof. A helical spring 69 is interposed between the wedge bar 67 and the adjacent end of each respective wedge 65 around the rod 66 for resiliently positioning the chisels in a manner more fully disclosed hereinbelow. Similarly a second wedge setting mechanism 70 substantially identical to the first mechanism 64 is provided for the chisels 55 and includes similar hydraulic cylinders 71 for actuating the same. The hydraulic cylinders 68 and 71 are connected by suitable flexible and rigid conduits to the hydraulic valve 42.

A pair of vertically disposed heavy duty hydraulic cylinders 74 are carried in spaced-apart relation by the upper cross member 26. Each of the cylinders 74 includes a depending vertically movable plunger shaft 76. A rectangular pressure plate 78 is rigidly connected centrally to the lowermost end portion of each of the plunger shafts 76. Each of the pressure plates are substantially larger than the area of the respective plunger shaft and extends longitudinally of the upper surface of the cross member 28 a selected distance. A pair of upstanding bolts 79 are rigidly connected to the upper surface of the cross member 28 and project upwardly through each respective pressure plate 78 through co-operating perforations provided adjacent each end portion of the plates for connecting the latter to the cross member. A helical spring 80 is interposed between the upper surface of each respective pressure plate and a nut and washer 81 of each respective bolt 79. A pair of pressure bars 82 are rigidly connected transversely to the upper surface of the cross member 28 in spaced-apart relation. The spacing between each pair of the pressure bars is preferably at least as great as the diameter of the respective plunger shafts 76. The purpose of the pressure bars is to provide spaced-apart contacting surfaces for contacting the under surface of the pressure plates 78. The perforations in the pressure plates 78 are preferably of such size that the upstanding bolts 79 are loosely received therethrough which permits relative biasing movement of the cross member 28 relative to the plane of the pressure plates without subjecting the bolts 79 to a binding action. Suitable conduits 83 operatively connect the cylinders 74 to the valve 42 and the hydraulic fluid supply. Thus, when the machine is in an inactivated position the cross member 28 is supported by the springs 80 and bolts 79. When the cross member 28 is lowered by the action of the cylinders 74 so that the cutting means 30 contacts the upper surface of a stone to be cut, the presure plates 78 contact the pressure bars 82 and transmit a downwardly directed force to the cutting means in a manner which will be more fully explained hereinbelow.

Figure 5:
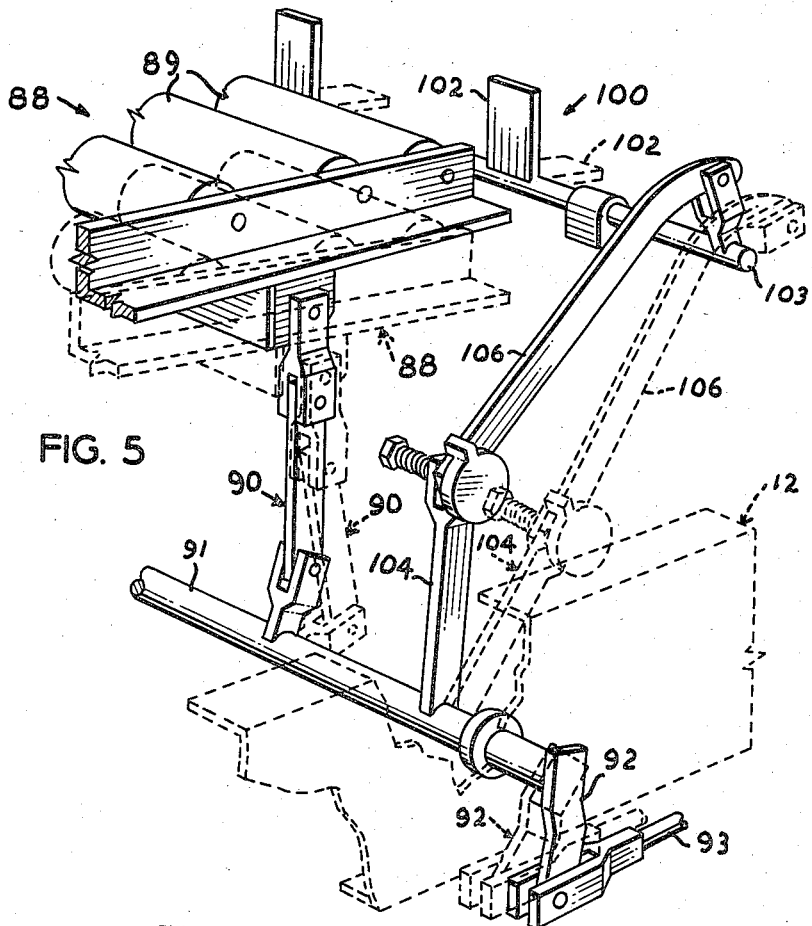
Figure 5 is a fragmentary perspective view of the retractable ramp and stop element.

As may be seen from the drawings, stone shown at 84 to be cut is preferably delivered to the machine from one side thereof and, to accomplish this, a conveyor or ramp 85 having transverse cylindrical rolls 86 has one end thereof supported adjacent one side of the machine by upstanding supports 87. The conveyor 85 may extend laterally of the machine any desired distance for providing ease of handling the stone and delivering the same to the cutting means of the machine. The upper surface of the rollers 86 substantially lie in a common plane with the upper cutting edge 56 of the lower cutting means 32. The conveyor 85 is terminated short of the lower cutting means and a short section of conveyor or delivery ramp 88 spans the distance between the conveyor 85 and the cutting means 32. The delivery ramp 88 is formed similar to the conveyor 85 in that it includes a plurality of rollers 89 journaled for rotation substantially parallel with relation to the longitudinal axis of the cutting means. The upper surface of these rollers 89 similarly lie in substantially the same plane as the cutting edge 56 of the lower cutting means. The delivery ramp 88 is mounted on pivoting linkage 90 connected to a control rod 91 carried by the base frame 12. One end of the control rod 91 is equipped with a bell crank 92 which is in turn pivotally connected to the plunger 93 of a small hydraulic cylinder 94. Suitable conduits 95 connect the cylinder 94 to the control valve 42. Thus, a stone to be cut is delivered to the machine over the conveyor 85 and is positioned between the cutting means 30 and 32 with the major portion of the stone 84 being supported by the delivery ramp 88 and, as shown by the dotted line action of Figs. 4 and 5, when the cylinder 94 is actuated, to pivot the control rod 91, the delivery ramp 88 is lowered out of contact with the lowermost surface of the stone which thus permits the stone 84 being cut to be held only by the cutting means 30 and 32 along the desired line of fracture.

The side of the machine opposite the stone delivery ramp 88 is provided with a skirt or shield 98 comprising a portion of the top of the wash tank 61 which is inclined downwardly and outwardly from the cutting plane of the machine. The purpose of the skirt 98 is to receive the wanted sections of cut stone and to dispose of any fragmentary unwanted chips or small sections of stone laterally of the machine. The upper surface of the skirt is provided with a plurality of spaced-apart upstanding rails 99 extending laterally outward from the cutting plane upon which the wanted sections of stone are supported while the dust particles and small chips of stone fall therebetween. The downward inclination of the skirt and rails is such that the coefficient of friction prevents the wanted sections of stone from falling to the ground and thus enables the workman to remove the same for packaging or stacking.

Movement of the stone to be cut into the plane of the cutting means is limited by a gauge means 100 comprising a plurality of upstanding stops 102 rigidly carried by a pivoting rod 103 journaled by the rails 99. A crank arm 104 secured to the control rod 91 is pivotally connected to the gauge rod 103 by a link 106 so that when the stone has been gauged or stopped at the desired position by contact with the stops 102 and the delivery ramp is lowered the crank arm 104 and the link 106 simultaneously lower the stops 102 laterally of the machine and out of contact with the edge of the stone. Thus, when the stone has been cut the wanted section of the same is free to be supported by the rails 99 and retrieved by the workman without hindrance of the stops 102.

Operation

Figure 7:
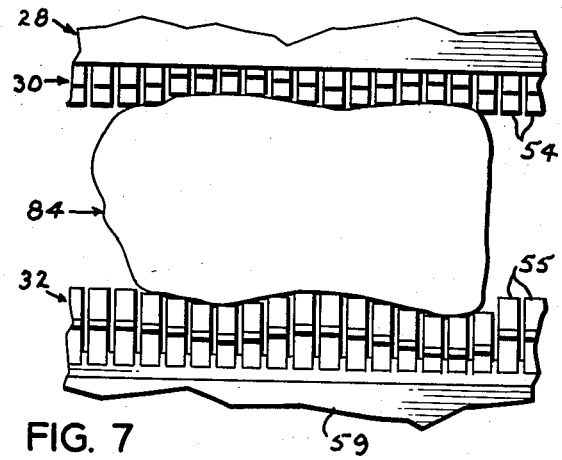
Figure 7 is a fragmentary side elevational view of the upper and lower cutting means engaged with the irregular surfaces of a stone to be cut.

Assuming the end edge of the stone 84 to be cut to be substantially smooth and at right angle to the sides thereof, the stone is manually moved along the conveyor 85 and onto the delivery ramp 88. The movement of the stone through the plane of the cutting means is stopped by contact with the stops 102 which properly positions the stone. The left hand lever 108 of the control valve 42, as seen in Fig. 1, is manually moved to allow the movable cross member 28 to be lowered to place chisels 54 of the upper cutting means 30 in contact with the upper surface of the stone 84. The other or right hand lever 110 of the control valve 42, as seen in Fig. 1, is then moved for actuating the cylinders 68 and 71 which position the wedges 65 in contact with the shank portions of the chisels 54 and 55 of the respective cutting means 30 and 32 and maintains the cutting edges 56 in intimate contact with the respective upper and lower normally uneven surfaces of the stone being cut as shown in Fig. 7. Thus, when any chisel is not firmly in contact with the surface of the stone and the structure of the respective cross member, wedges 65 fill the void or space between the shank of the chisel and the cross member. The springs 69 permit those wedges not activated because of contact of the chisel shank with the respective cross member to remain in their inactivated positions against the pressure of the wedge bar 67. Simultaneous with the actuation of the cylinders 68 and 71 the cylinder 94 is actuated to pivot the control rod 91 and gauge rod 103, thus lowering the delivery ramp 88 from contact with the undersurface of the stone 84 and lowering the stops 102 out of contact with the edge of the stone. The valve lever 108 is then moved to supply hydraulic fluid pressure to the cylinders 74 which forcibly lowers the cross members 28 and severs the stone 84 along the predetermined line of fracture as defined by the cutting means 30 and 32. Lever 110 is then moved in the opposite direction for reversing the action of the cylinders 74 and lifting the cross member 28 and the upper cutting means 30. The cross member 28 need be raised only a distance sufficient to position the plane of the cutting means 30 above the surface of the stone which is to be cut again. The lever 108 is moved to its former position for retracting the wedges 65 and raising the delivery ramp 88 to stone supporting position and repositioning the gauging means 100. This completes one complete cycle of operation. It seems obvious that if the stone 84 has irregular shaped edges that the same may be trued or squared by properly positioning the stone manually to cut off unwanted projections or irregularities by the action of the machine as described hereinabove.

Figure 6:
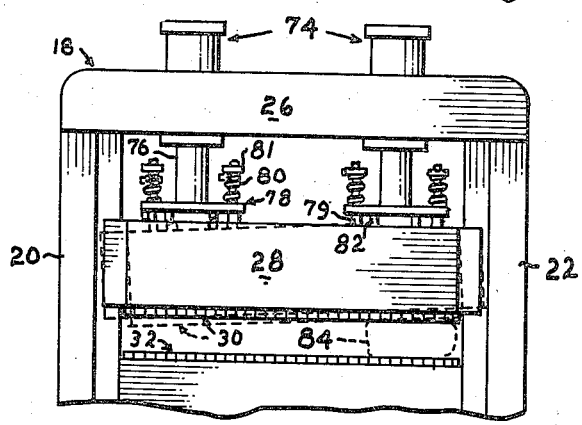
Figure 6 is a fragmentary diagrammatic side elevation view of the upper portion of the machine illustrating, in dotted lines, the permitted biasing movement of the intermediate cross member.

The manner of connecting the cross member 28 to the plunger shafts 76 permits the cutting of a stone 84 at one end of the cutting means as is shown in Fig. 6. With a stone 84 disposed at one end portion of the cutting means a certain amount of biasing action of the moving cross member 28 relative to the posts 20 and 22 is unavoidable. As shown by the dotted line position of Fig. 6 the end of the cross member 28 and cutting means 30 opposite the end in contact with the stone moves downwardly in a biasing action due to the resistance of the stone and the hydraulic pressure in the cylinders 74. This arrangement permits one end of the cross member to be moved downwardly as much as 2 inches below its opposite end without damage to the component parts. As may be seen from the drawings, the pressure bar disposed toward the end of the machine holding the stone of each pair of pressure bars 82 maintains contact between the cross member 28 and the lower surface of the respective pressure plate 78 thus avoiding the stress or binding action which would tend to damage the actuating cylinders 74 if the plunger shafts were rigidly connected to the upper surface of the cross member 28.

Obviously the invention is susceptible to some change or alteration without defeating its practicability, and I therefore do not wish to be confined to the preferred embodiment shown in the drawings and described herein, further than I am limited by the scope of the appended claims.

I claim:
1. A stone cutting machine, including: a rigid upright frame, said frame comprising a pair of T-shaped posts joined at their respective upper and lower ends in spaced-apart parallel relation by an upper and a lower cross member, the shank portion of each of the T-shaped posts projecting inwardly of the frame in co-operating relation; a movable cross member extending horizontally between said posts, said movable cross member having a vertical socket at each of its ends slidably engaged with the opposing lateral sides of the shank portion of said T-shaped posts, the length of said movable cross member between the sockets being less than the spacing between said T-shaped posts; a guide bar carried longitudinally by the upper surface of said lower cross member and the lower surface of said movable cross member, respectively, said guide bars each having a series of longitudinally spaced apart vertically disposed apertures therethrough; a chisel having a sharpened edge slidably carried for independent vertical movement by each respective aperture in said guide bars forming a lower cutting jaw and an upper cutting jaw lying in a common vertical plane, a plurality of wedges transversely carried in spaced-apart relation by said frame, one said wedge being interposed between the base end of each respective chisel and the respective cross member; hydraulic cylinder means connecting said movable cross member to said upper cross member for movement toward and away from the latter; hydraulic valve means connected with said hydraulic cylinder means for moving said movable cross member downward and gripping a stone to be cut between said lower and said upper cutting jaws along a predetermined line of fracture; hydraulic valve means connected with said wedges for moving the latter and positioning the sharpened edge of each of said chisels into intimate contact with the uneven surface or a stone to be cut along a predetermined line of fracture; a transverse roller equipped deliver ramp remotely mounted pivotally at one end laterally of the vertical plane of said cutting jaws, the upper surface of said ramp lying in substantially the same horizontal plane with respect to the plane formed by the sharpened edge of said lower cutting jaw; pivoting linkage supporting the end of said ramp adjacent said lower jaw; and hydraulic cylinder means connected with said pivoting linkage for lowering the upper surface of said ramp out of contact with the under surface of a stone gripped between said upper and lower cutting jaws.

2. A stone cutting machine, including: a base; a rigid upright frame carried by said base, said frame comprising a pair of T-shaped posts joined at their respective upper and lower ends in spaced-apart parallel relation by an upper and a lower cross member, the shank portion of each of said T-shaped posts projecting inwardly of the frame in co-operating relation; a movable cross member extending horizontally between said posts, said movable cross member having a vertical socket at each of its ends slidably engaged with the opposing lateral sides of the shank portion of said T-shaped posts, the length of said movable cross member between the sockets being less than the spacing between said T-shaped posts; a guide bar carried longitudinally by the upper surface of said lower cross member and the lower surface of said movable cross member, respectively, said guide bars each having a series of longitudinally spaced-apart vertically disposed apertures therethrough; a chisel having a cutting edge slidably carried for independent vertical movement by each respective aperture in said guide bars forming co-operating upper and lower cutting jaws; a plurality of wedges transversely carried in spaced-apart relation by said frame, one said wedge being interposed between the base end of each respective chisel and the respective cross member; hydraulic cylinder means connecting said movable cross member to said upper cross member for movement toward and away from the latter; hydraulic valve means connected with said hydraulic cylinder means for moving said movable cross member downward and gripping a stone to be cut between said lower and said upper cutting jaws along a predetermined line of fracture; hydraulic valve means connected with said wedges for moving the latter and positioning the cutting edge of each of said chisels into intimate contact with the uneven surface of a stone to be cut along a predetermined line of fracture; a stone delivery ramp pivotally mounted at one end by said base, said ramp having a series of rollers arranged transversely of the desired direction of travel of the stone to be cut for forming a horizontal plane coplanar with respect to the horizontal plane defined by the cutting edge of said lower cutting jaw; a shaft pivotally carried horizontally by said base below said ramp; pivotally connected linkage extending between and connected to said ramp and said shaft; and hydraulic cylinder means connected with said shaft for pivoting said shaft and lowering the upper surface of said ramp out of contact with the lower surface of a stone gripped between said upper and said lower cutting jaws.

References Cited in the file of this patent
UNITED STATES PATENTS

| | | |
|---|---|---|
| 2,762,359 | Entz | Sept. 11, 1956 |
| 2,768,620 | Jenkins et al. | Oct. 30, 1956 |
| 2,778,354 | Crowl | Jan. 22, 1957 |